United States Patent [19]

Holzer, Jr.

[11] Patent Number: 5,103,565
[45] Date of Patent: Apr. 14, 1992

[54] BLADE HOLDER FOR RECIPROCATING SAWS

[75] Inventor: Michael Holzer, Jr., Wauconda, Ill.

[73] Assignee: Skil Corporation, Chicago, Ill.

[21] Appl. No.: 766,639

[22] Filed: Sep. 26, 1991

[51] Int. Cl.$^5$ ............................................. B23D 51/10
[52] U.S. Cl. ........................................ 30/392; 83/697; 279/76; 403/317; 409/287
[58] Field of Search ................. 30/332, 333, 334, 336, 30/338, 339, 392, 393, 394; 83/697, 698; 279/1 B, 1 F, 44, 45, 74, 76, 87, 89, 93; 403/317, 319; 407/102, 107, 109; 409/287

[56] References Cited

U.S. PATENT DOCUMENTS

| | | | |
|---|---|---|---|
| 2,101,362 | 12/1937 | Davidson | 83/697 X |
| 2,107,581 | 2/1938 | Parsons et al. | 279/76 |
| 2,468,195 | 4/1949 | Hanes | 279/87 |
| 4,106,181 | 8/1978 | Mattchen | 30/339 X |
| 4,601,477 | 7/1986 | Barrett et al. | 279/76 X |

Primary Examiner—Hien H. Phan
Assistant Examiner—Raymond D. Woods
Attorney, Agent, or Firm—Jones, Day, Reavis & Pogue

[57] ABSTRACT

In the first embodiment, the distal end of a reciprocating plunger of a power saw includes a longitudinally extending cavity receiving a block-like wedge member. A planar wall of the cavity and a planar face of the wedge member are arranged for substantial coextensive engagement with respective opposed faces of the saw blade. A spring in the cavity engages the wedge member for urging the same outwardly of the cavity. A pin extends through the wedge and has its opposite ends received in slots in opposed walls of the plunger. These slots are inclined with respect to the longitudinal axis of the plunger and cooperate with the pin to form a cam to urge the planar surfaces into clamping engagement with the blade under the influence of the spring. The blade may be released by forcing the wedge inwardly of the cavity under finger pressure. In a second embodiment, a similar block-like wedge member cooperates with a U-shaped member mounted on the plunger. An exterior planar wall of the plunger and a planar face on the inside of the bight portion of the U-shaped member are arranged for respective coextensive engagement with opposed faces of a saw blade for holding the same in place under the influence of a spring which cooperates with cam constituted by a pin and an inclined slot in the block-like wedge member.

10 Claims, 2 Drawing Sheets

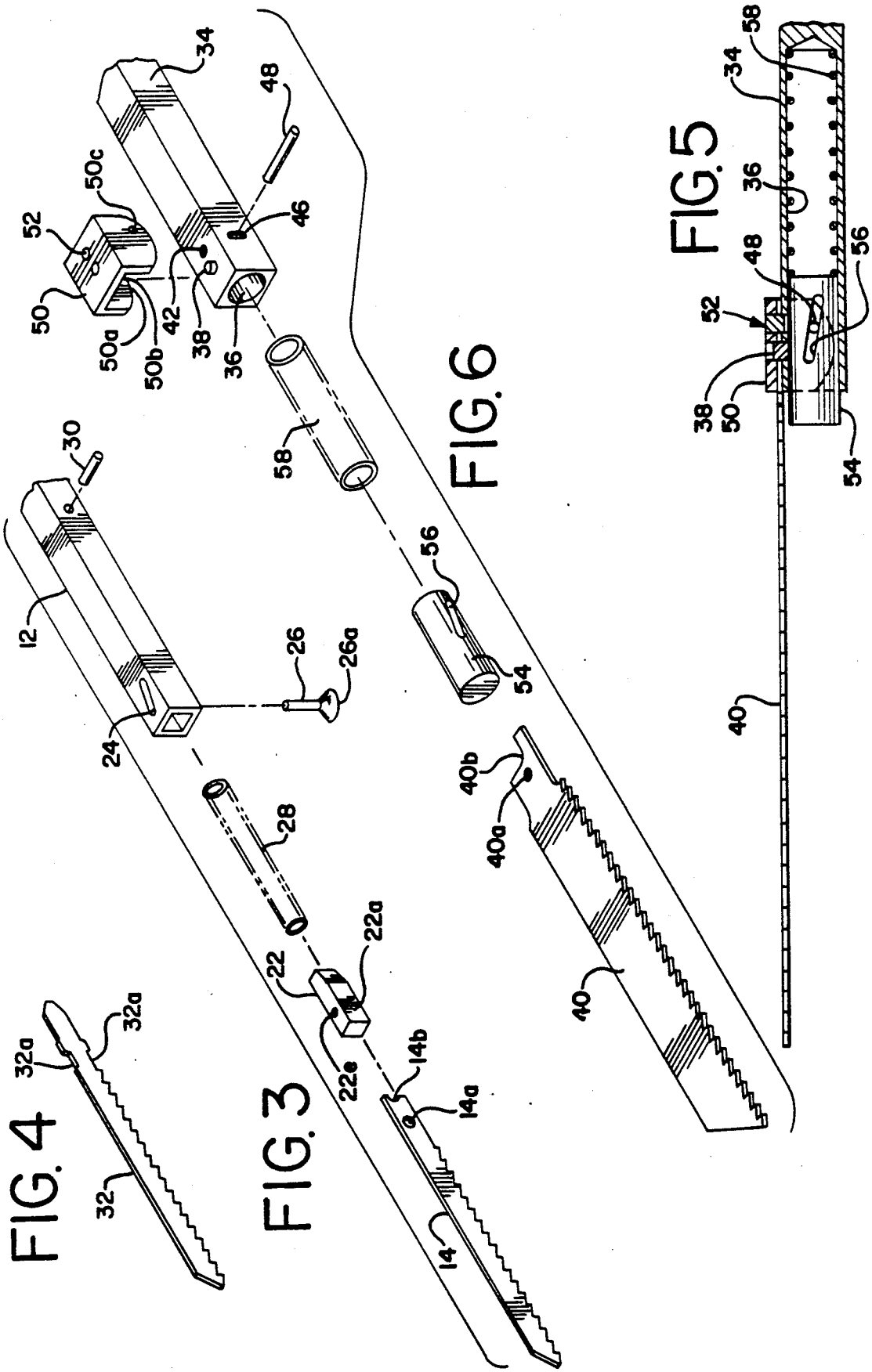

BLADE HOLDER FOR RECIPROCATING SAWS

FIELD OF THE INVENTION

The present invention relates to mechanisms for detachably mounting saw blades, and more particularly to blade holders for powered reciprocating saws.

BACKGROUND OF THE INVENTION

Powered reciprocating saws include jigsaws and other reciprocating saws which are referred to in the trade as "recipro" saws. These saws employ linear saw blades which are reciprocated along a rectilinear path.

The saw blades used with these powered saws typically include a hole in the end of the blade opposite the working end of the blade. The power tools under consideration typically include a blade holder having a slot for receiving the saw blade and a set screw which is received in the hole in the blade. This set screw must be tightened to clamp the blade in place in the blade holder. Although this form of blade holder is generally satisfactory, it does suffer from the disadvantage in that the blade is likely to become loose during operation of the tool unless the set screw has been made very tight. As is known to those skilled in the art, powered saws of the type under consideration are subject to high vibration forces during use. A further disadvantage with the type of blade holder under discussion resides from the fact that tightening and loosening of the set screw necessarily prevents the very rapid change of blades. An even further disadvantage of this type of blade holder is the requirement of a separate tool for fixing and removal of the blade.

Attempts have been made to provide saw blade holders which do not require the use of a set screw. One example of such a blade holder is shown in U.S. Pat. No. 3,927,893, assigned to the assignee of the present invention. The blade holder shown in this patent includes a cap which is threadingly engaged with the plunger of the power tool. Rotation of the cap relative to the plunger in one direction causes axial movement of the cap for squeezing a member against the blade to hold the latter in place. Rotation of the cap in the other direction serves to release the blade. Operation of this device requires rather significant rotational forces for both securing the blade in place and loosening of the blade for separation from the tool, often requiring the use of a wrench.

Other attempts to secure reciprocating saw blades in place without the use of a set screw are represented by Hoffman U.S. Pat. Nos. 3,750,283, 4,204,692 and 4,285,129. For the most part, the devices shown in these patents are complicated and expensive to produce because they employ many separate parts. Further, the blade holders disclosed in these patents require special saw blades having notches or recesses in their edges to cooperate with various projections forming part of the blade holder mechanism.

The present invention provides a new and improved blade holder which can accommodate conventional saw blades and which can hold the saw blade in place without the use of set screws and without employing any form of a tool. According to the present invention, the saw blade can be mounted in place and detached using only finger pressure.

It is a primary object of the present invention to provide a new saw blade holder of the type described.

A further object of the present invention is the provision of a saw blade holder which does not require the use of the set screw or any form of a fastening tool.

Still another object of the present invention is the provision of a new and improved blade holder which is of simple construction and which can be manufactured at low cost.

These and other objects and advantages of the invention will become apparent from the following specification disclosing preferred embodiments.

DESCRIPTION OF THE DRAWINGS

FIG. 3 is an exploded isometric of the tool holder disclosed in FIG. 2;

FIG. 4 is an isometric view showing a different type of saw blade which may be employed with the present invention;

FIG. 5 is an elevation and section of a modified form of the present invention; and FIG. 6 is an exploded isometric of the tool holder shown in FIG. 5.

DESCRIPTION OF THE INVENTION

Figure 1:
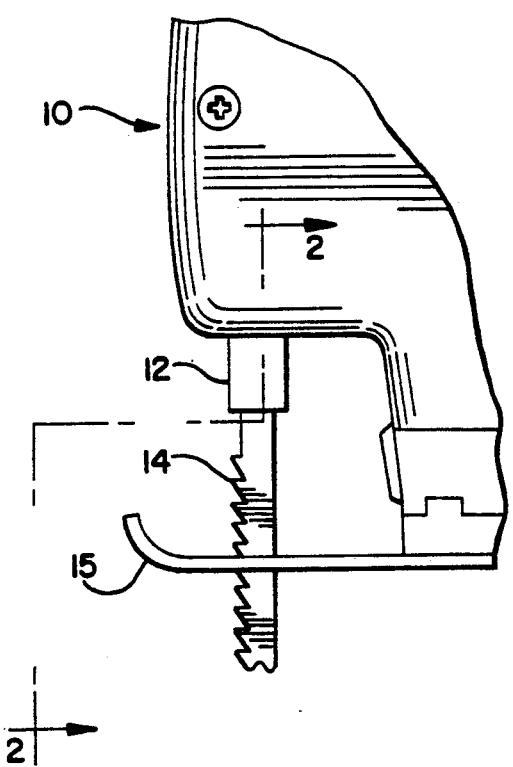
FIG. 1 is a fragmentary side elevation of a jigsaw embodying the present invention.

Referring to FIG. 1, a jigsaw, generally designated 10, includes an electric motor and a suitable mechanism, such as a scotch yoke mechanism (not shown), for imparting reciprocation to a plunger 12. As will become clear from the disclosure to follow, the plunger 12 includes a blade holding mechanism for detachably retaining the saw blade 14 for reciprocation in a slot formed in the usual foot plate 15. It will be understood that the blade holder mechanisms of the present invention are not limited to use with a jigsaw but rather have applicability to other types of powered reciprocating saws.

Figure 2:
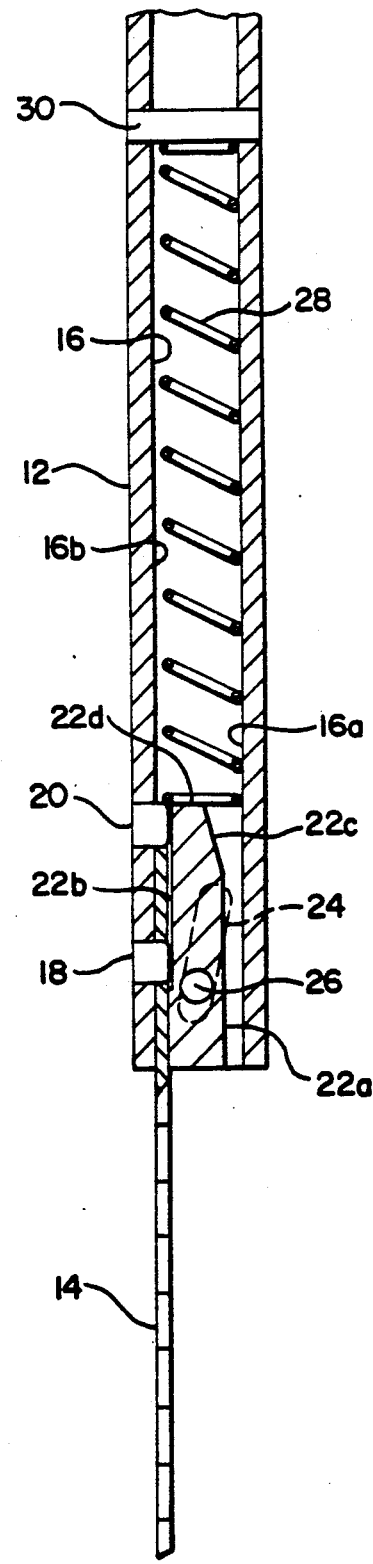
FIG. 2 is an enlarged partial side elevation and partial section taken along the line 2—2 of FIG. 1.

Referring to FIGS. 2 and 3, it will be seen that the plunger 12 is hollow at least at the distal end portion thereof and thus defines a longitudinally extending cavity 16. The end of the saw blade 14 opposite its working end is received in the cavity 16 as seen in FIG. 2. Plunger 12 mounts a pin 18 which extends a short distance into the cavity 16; the pin 18 is adapted to be received within the opening or recess 14a of the saw blade. Preferably, the plunger 12 mounts a second pin 20 which also projects into the cavity 16. The saw blade includes an arcuate recess 14b at its end adjacent the opening 14a for receiving the pin 20, thus permitting the latter to act as a stop for limiting the amount of movement of the saw blade into the cavity 16. It will be understood that the saw blade just described is of conventional construction and is readily available at almost all hardware stores.

A block-like wedge member 22 is configured for being received within the cavity 16. As noted in FIG. 2, the wedge 22 is dimensioned such that its face 22a is spaced from the wall 16a of the plunger. It will be seen that the opposite face 22b of the wedge is of planar shape and adapted for substantial coextensive engagement with one face of the blade 14 as seen in FIG. 2. The wedge includes a beveled or chamfered surface 22c which joins with an end surface 22d.

The plunger 12 includes a pair of slots 24 which are inclined with respect to the longitudinal axis of the plunger. These slots receive opposite ends of a pin 26.

This pin extends through a bore 22e formed in the wedge 22. One end of the pin 26 joins with a knob 26a. The other end of the pin is suitably configured or deformed to prevent removal of the pin 26 from the plunger.

A coil spring 28 is received within the cavity 16 of the plunger. One end of this spring engages the face 22d of the plunger. The other end of this spring abuts a pin 30 which is suitably mounted in the plunger.

It will be apparent that as the wedge 22 is forced inwardly of the cavity 16 against the force of the spring 28, the wedge will be cammed toward the wall 16a by reason of the engagement between the pin 26 and the inclined slots 24. Because the coil spring engages the face 22d and because that face is offset with respect to the longitudinal central axis of the wedge, inward movement of the wedge against the force of the spring will tend to tilt or skew the wedge about the pin 26 thereby creating an adequate opening between the face 22b of the wedge and the wall 16b of the cavity for ready insertion of the saw blade.

When it is desired to mount a saw blade in place, the operator, using only finger pressure, engages the knob 26a and forces the plunger 22 inwardly of the cavity 16. The wedge 22 will be cammed toward the wall 16a and will rotate slightly about the pin 26 for opening a space between the wedge face 22b and the wall 16b of the plunger cavity. The saw blade 14 will then be inserted into the opening just described until the recess 14b comes into engagement with the pin 20. The blade will then be swung slightly for reception of the pin 18 into the blade opening 14a. Release of the wedge will permit the spring 28 to force the wedge 22 outwardly of the cavity. By reason of the inclined slots 24, this movement of the wedge will cause the surface 22b to be cammed against the blade 14. Thus, it will be apparent that opposed faces of the blade 14 will be clamped by reason of respective engagement with the wall 16b and the face 22b of the wedge. The cavity 16 is preferably of rectangular cross-section thereby resulting in a planar configuration for the wall 16b. The wall 16b and the wedge face 22b constitute opposed planar surfaces for substantial coextensive engagement with opposed faces of the blade thereby securely clamping the blade in place under the influence of the spring 28.

When it is desired to remove the blade 14, the operator simply grasps the knob 26a, again using finger pressure, and retracts the wedge to separate the face 22b from the blade and to create the opening referred to above. The blade 14 is then swung slightly to disengage the pin 18 from the opening 14a thus permitting ready removal of the blade 14. The spring 28 is designed such that it will provide an adequate force to the wedge for bringing about the clamping action just described and yet permit easy retraction of the wedge by finger pressure.

A slightly different form of saw blade 32 is shown in FIG. 4. This saw blade includes a pair of opposed recesses or openings 32a. The blade holding mechanism of the present invention can be readily configured to accommodate this form of saw blade. In this regard, in lieu of the pins 18 and 20, the plunger 12 would be provided with a pair of aligned pins or other suitable formations (not shown) for reception within the recesses 32a. It will be apparent that the blade 32 would be installed and removed in a manner just described with reference to the blade 14. The blade 32 is commercially available although it is not in widespread use as is the case with the blade 14.

A modified form of the invention is disclosed in FIGS. 5 and 6. The plunger 34 of the power tool, which may be a jigsaw or a recipro saw, is provided with a blind bore 36. Although the bore 36 is disclosed as being circular in cross section, the bore could of course be of rectangular cross section.

The plunger 34 mounts an external pin 38 adapted to be received within the opening or recess 40a of a saw blade 40. The plunger 34 includes an aperture 42 adjacent the pin 38.

The plunger 34 also includes a pair of aligned slots 46. As noted in FIG. 6, the slots 46 are elongated in a direction transverse to the longitudinal axis of the plunger. These slots loosely receive a pin 48.

A generally U-shaped clamp 50 defines a recess 50a thus permitting the clamp to be mounted on the plunger 34 at the distal end of the latter. This recess is defined in part by a planar wall 50b on the inside of the bight portion of the U-shaped member. The clamp is mounted on the plunger by the pin 48. To this end, the clamp is provided with opposed openings 50c for receiving the ends of the pin 48. By reason of the elongated nature of the slots 46, clamp 50 is permitted limited movement toward and away from the plunger. The clamp 50 mounts a pin 52 adapted to be received within the recess 40b of the saw blade. As noted in FIG. 5, the pin 52 extends at least partially into the aperture 42 formed in the plunger. Again, the blade 40 is available from a variety of sources.

A block-like wedge 54 includes a through slot 56 which is inclined with respect to the longitudinal central axis of the cylindrical wedge. Slot 56 receives the pin 48.

A coil spring 58 is mounted within the blind bore 36. One end of this spring abuts the end of the blind bore; the other end of the spring engages the inner end of the wedge 54.

It will be apparent that when the wedge 54 is forced inwardly of the blind bore, the inclined slot 56 will act as a cam engaging the pin 48 thus forcing the clamp 50 away from the plunger. When the wedge 54 is moved in the other direction under the influence of the spring 58, the pin 48 and slot 56 will serve to cam the clamp 50 toward the plunger as shown in FIG. 5. Again, the spring 58 is designed such that it will provide adequate clamping forces to hold the blade in place and yet permit ready movement of the wedge within the blind bore by using finger pressure only.

As noted in FIG. 5, a portion of the wedge 54 extends exteriorly of the plunger. Thus, when it is desired to insert a blade, the operator simply uses finger pressure to force the wedge 54 inwardly of the blind bore 34. The camming action brought about by the pin 48 in the inclined slot 56 will cam the clamp 50 away from the plunger to provide a space for mounting of the saw blade 40. The saw blade will be inserted between the plunger and the clamp until the recess 40b comes into engagement with the pin 52. The saw blade will then be manipulated for inserting the pin 38 within the opening 40a on the saw blade. Release of the wedge 54 will permit the spring 58 to force the wedge to the position shown in FIG. 5 thus clamping the saw blade 40 between the plunger and the clamp 50. The outside surface of the plunger 34 adjacent the pin 38 and the planar surface 50b of the clamp are adapted for substantial coextensive engagement with opposed faces of the blade for securely clamping the blade in place under the influence of the spring 58. It will be appreciated that the saw blade 40 can be quickly removed simply by depressing the wedge 54.

While the invention has been described in connection with preferred embodiments, it is not intended to limit the scope of the invention to the particular forms set forth, but on the contrary, it is intended to cover such alternatives, modifications and equivalents as may be included within the spirit and scope of the invention as defined by the appended claims.

We claim:

1. Apparatus for releasably retaining a saw blade to a powered mechanism including an elongated reciprocating plunger, wherein said saw blade is of the type having at least one recess in an end thereof opposite a working end, said apparatus comprising:
    (a) a formation fixed to said plunger and adapted to be received within said recess of the saw blade;
    (b) said plunger having a first planar surface adjacent said formation for substantial coextensive engagement with a portion of one face of the saw blade in the area of the recess thereof;
    (c) clamping means including a second planar surface for substantial coextensive engagement with a portion of another face of the saw blade in the area of the recess thereof;
    (d) said plunger having a longitudinally extending cavity adjacent a distal end of the plunger;
    (e) said clamping means including a block-like member received within said cavity for longitudinal reciprocal movement therein;
    (f) biasing means contained within said cavity and engaged with said block-like member for urging said block-like member toward the distal end of said plunger; and
    (g) camming means engaged with said block-like member and said plunger and actuated by said biasing means for forcing said second planar surface toward said first planar surface thereby to clamp the saw blade disposed therebetween, the clamping means being released by manually forcing said block-like member against said biasing means.

2. The apparatus according to claim 1 further defined by:
    (a) said clamping means including a generally U-shaped member defining an opening for receiving a portion of said plunger, a portion of said opening being defined by said second planar surface; and
    (b) a pin engaged with and said plunger and said U-shaped member for shiftably mounting said U-shaped member on the plunger, said pin forming part of said camming means.

3. The apparatus according to claim 1 further defined by:
    (a) said clamping means including a generally U-shaped member defining an opening receiving a portion of said plunger, a portion of said opening being defined by said second planar surface;
    (b) said plunger having a pair of aligned apertures communicating with said cavity and being elongated in a direction transverse to the longitudinal axis of the plunger;
    (c) a pin received within said apertures and being engaged with said U-shaped member for movably mounting said U-shaped member on the plunger; and
    (d) said block-like member including a through slot receiving said pin and being inclined with respect to the longitudinal axis of said plunger whereby longitudinal movement of said block-like member under the influence of said biasing means causes movement of said U-shaped member toward said plunger for bringing the first and second planar surfaces into clamping engagement with the saw blade and wherein movement of said block-like member against said biasing means causes movement of said U-shaped member away from said plunger for releasing the saw blade.

4. The apparatus according to claim 3 wherein a portion of said block-like member extends exteriorly of said plunger for being manually engaged against said biasing means.

5. The apparatus according to claim 4 wherein said U-shaped member includes a projection engageable with an edge surface of said blade for limiting movement of the blade relative to said U-shaped member.

6. The apparatus according to claim 1 further defined by:
    (a) said first planar surface defining a portion of said cavity adjacent the distal end of said plunger;
    (b) said second planar surface being defined by a face of said block-like member;
    (c) a pin supported by the plunger and engaged with said block-like member; and
    (d) slot means formed on said plunger and receiving said pin, said slot means being inclined with respect to the longitudinal axis of said plunger, said slot means and said pin constituting said camming means.

7. The apparatus according to claim 6 wherein said slot means is constituted by a pair of aligned slots formed in opposed walls of said plunger and communicating with said cavity.

8. The apparatus according to claim 7 further defined by a second formation formed on said plunger for engagement with an edge surface of said blade for limiting movement of the blade relative to the plunger.

9. The apparatus according to claim 6 further defined by a knob secured to one end of said pin thereby to facilitate manual movement of said block-like member.

10. The apparatus according to claim 6 wherein said block-like member has an offset face at an inner end which is engaged by said biasing means whereby, upon movement of said block-like member against said biasing means said biasing means tends to pivot said block-like member about said pin for creating an enlarged opening between said first and second planar surfaces.

* * * * *